April 9, 1940. W. EWALD 2,196,388
CUSHION SEAL BEARING
Filed April 24, 1937

Inventor
WARREN EWALD
By A. S. Krot
Attorney

Patented Apr. 9, 1940

2,196,388

UNITED STATES PATENT OFFICE 2,196,388

CUSHION SEAL BEARING

Warren Ewald, Racine, Wis., assignor to Young Radiator Company, Racine, Wis.

Application April 24, 1937, Serial No. 138,788

2 Claims. (Cl. 308—26)

The present invention relates to bearings, particularly the type used on air conditioning units and air moving cabinets or fan housing.

The principal objects of the present invention are to provide a bearing which may be secured to the wall of a housing or cabinet and provide self-alignment for the bearing member relative to the housing or the bearing support, cushioning or absorbing any vibrations or sounds that may develop from the action of the rotor on the shaft and forming a seal between the interior and exterior of the housing.

Specifically stated the objects of the present invention are to supply a rubber cushion for separating the bearing member from its support, yieldingly holding the bearing member into position, forming a seal between these members and to provide a simple and inexpensive means for forming an electrical connection between the bearing and supporting member for the escape to the bearing support, of any static electricity that may develop on the rotating members because of belt of air friction.

Generally stated the object of the present invention is to provide a simple inexpensive and efficient bearing, one easily manufactured, assembled and secured to its carrying unit.

To these and other useful ends this invention consists of parts and combinations thereof or their equivalents as described, claimed and shown in the accompanying drawing in which:

Figure 1:
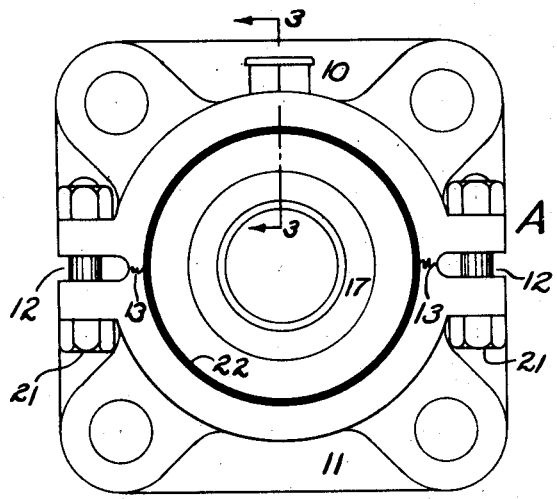
Fig. 1 is an end elevation of a bearing equipped with my invention.

As thus illustrated the bearing support member or base is designated in its entirety by reference character A and comprises two halves 10 and 11. These half members may be manufactured separately or be cast and machined in a single piece having side pockets 12—12 which extend to within a short distance of the bearing opening. Thus after member A has been machined, the two halves may be broken apart as on line 13—13. I provide an opening 14 through which a suitable oiler 15 protrudes. I provide an annular groove 16, which is preferably formed on a transverse radius from a point midway the bearing and on a transverse center to the shaft.

I provide a bearing member 17 having an annular opening 18 and a screw threaded opening 19. This bearing member is machined on its outer diameter so as to form a spherically shaped groove 20, being the same width and shape transversely as groove 16. The diameter of groove 20 is somewhat less than the diameter of groove 16.

Figure 2:
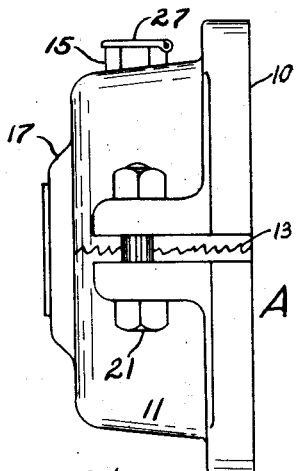
Fig. 2 is a side elevation of the device as shown in Figure 1.

I provide a rubber band 22 which is placed in groove 20, having an opening 23 for the reception of oiler 15. Member 22 when in position in groove 20 is somewhat larger in diameter than groove 16, thus when members 10 and 11 are placed into position over the bearing as illustrated in Figures 1, 2, and 3 and held together by means of bolts 21—21, member 22 will be somewhat compressed.

Thus it will be seen that member 17 will be yieldingly held in a central position within member A by the filler formed by member 22 and the connection between these members will be air sealed. As a matter of convenience I have illustrated the bearing member as being provided with a bronze bushing 24, the bushing being made from porous material whereby when the annular chamber 18 is supplied with a suitable amount of oil, the oil will be allowed to pass through the bushing into the bearing in sufficient quantity to suitably lubricate the shaft.

Figure 3:
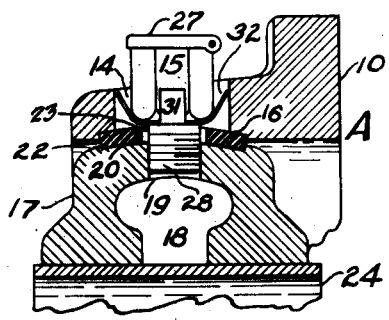
Fig. 3 is an enlarged fractional section taken on line 3—3 of Figure 1.

As a matter of convenience I have illustrated the oil fitting 15 having a closure 27 and a screw threaded portion 28 which is adapted to be secured to member 17 as illustrated in Figure 3. The opening 14 in member 10 is large enough to pass over closure 27 for convenience in assembling.

When the bearing member is electrically insulated from its supporting base as illustrated and where the base is secured to a housing which is grounded through pipe connections or otherwise, any static electricity which may accumulate on the shaft through the belt or air friction in the fan rotor, will be forced to jump across the gap between members 10 and 17. This is not desirable for several reasons; therefore I provide an electrical connection between the bearing and its support forming a path for the escape of any static electricity that may accumulate on the shaft.

Figure 4:
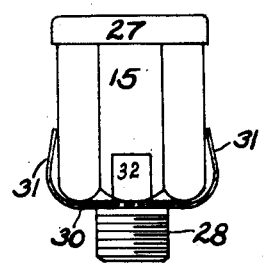
Fig. 4 is an enlarged side view of the oiling device illustrating the position of my circuit closing device, transverse to that shown in Figure 3.
Figure 5:
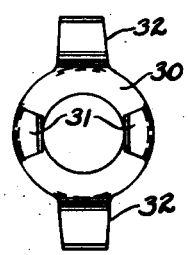
Fig. 5 is a top view of the circuit closing member before being assembled over the oiler and in the bearing.

I provide a brass washer 30 having an orifice adapted to fit closely over the threaded portion 28 of fitting 15. This washer is provided preferably with four arms 31—31 and 32—32. Arms 31 are bent as clearly illustrated in Figure 5 so their ends tightly embrace fitting 15 (see Figure 4). Arms 32 are bent so they extend outwardly as illustrated in Figure 5. Thus two of the arms make an electrical connection to the fitting and two will make an electrical connection to member 10 by contacting the wall of opening 14 (see Figure 3). Clearly this connection will be flexible and while it forms a perfect electrical connection it will not act to interfere with the cushioning effect of member 22.

Figure 6:
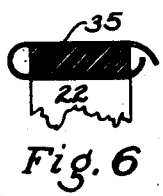
Fig. 6 is a transverse fractional sectional view of the rubber cushion band illustrating thereon a modified form of circuit closing device.
Figure 7:
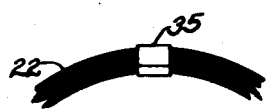
Fig. 7 is an end fractional view of the device as illustrated in Figure 6.

In Figures 6 and 7 I illustrate a modification of the circuit forming device, comprising a metal member 35 being shaped and positioned on member 22 as illustrated. Thus member 35 being made from thin material will readily conform to the transverse shape of member 22 after the assembly of the device has been completed.

Clearly many minor changes, particularly in the shape of the rubber band and its seats, and in the electric circuit closing device, may be made without departing from the spirit and scope of this invention as recited in the appended claims. Obviously any form of bearing may also be substituted for that shown.

Having thus shown and described my invention I claim:

1. A device of the class described, comprising a bearing being spherically shaped on its longitudinal center and having end flanges for the sphere, a rubber band positioned between said flanges, a base for said bearing having an opening and a shape with end flanges adapted to embrace said rubber band, said band having a thickness to thereby form a space between said flanges, said base being formed in halves and having bolts whereby said halves may be positioned over and securely clamped to said band, said bearing having a screw threaded opening and one of said halves having a relatively large opening which registers with said screw threaded opening, an oiling device screw threaded into said bearing opening, a spring washer positioned over the threaded portion of said oiling device and having projecting arms adapted to yieldingly contact the wall of said large opening.

2. A device of the class described, comprising a bearing being spherically shaped on its longitudinal center and having end flanges for the sphere, a rubber band positioned between said flanges, a base for said bearing having an opening and a shape with end flanges adapted to embrace said rubber band, said band having a thickness to thereby form a space between said flanges, said base being uniform and formed in halves and having bolts whereby said halves may be positioned over and securely clamped to said band, said bearing having a screw threaded opening and one of said halves having a relatively large opening which registers with said screw threaded opening, an oiling device screw threaded into said bearing opening, means forming an electrical connection between said bearing and base.

WARREN EWALD.